April 12, 1927. 1,624,494
H. MASON ET AL
GRINDING MECHANISM
Filed Jan. 30, 1926 8 Sheets-Sheet 1

INVENTORS:
HOWARD MASON,
WALTER BIXBY,
HUGH LEWIS BOGAN JR.
BY Emery, Booth, Janney & Varney ATTORNEYS.

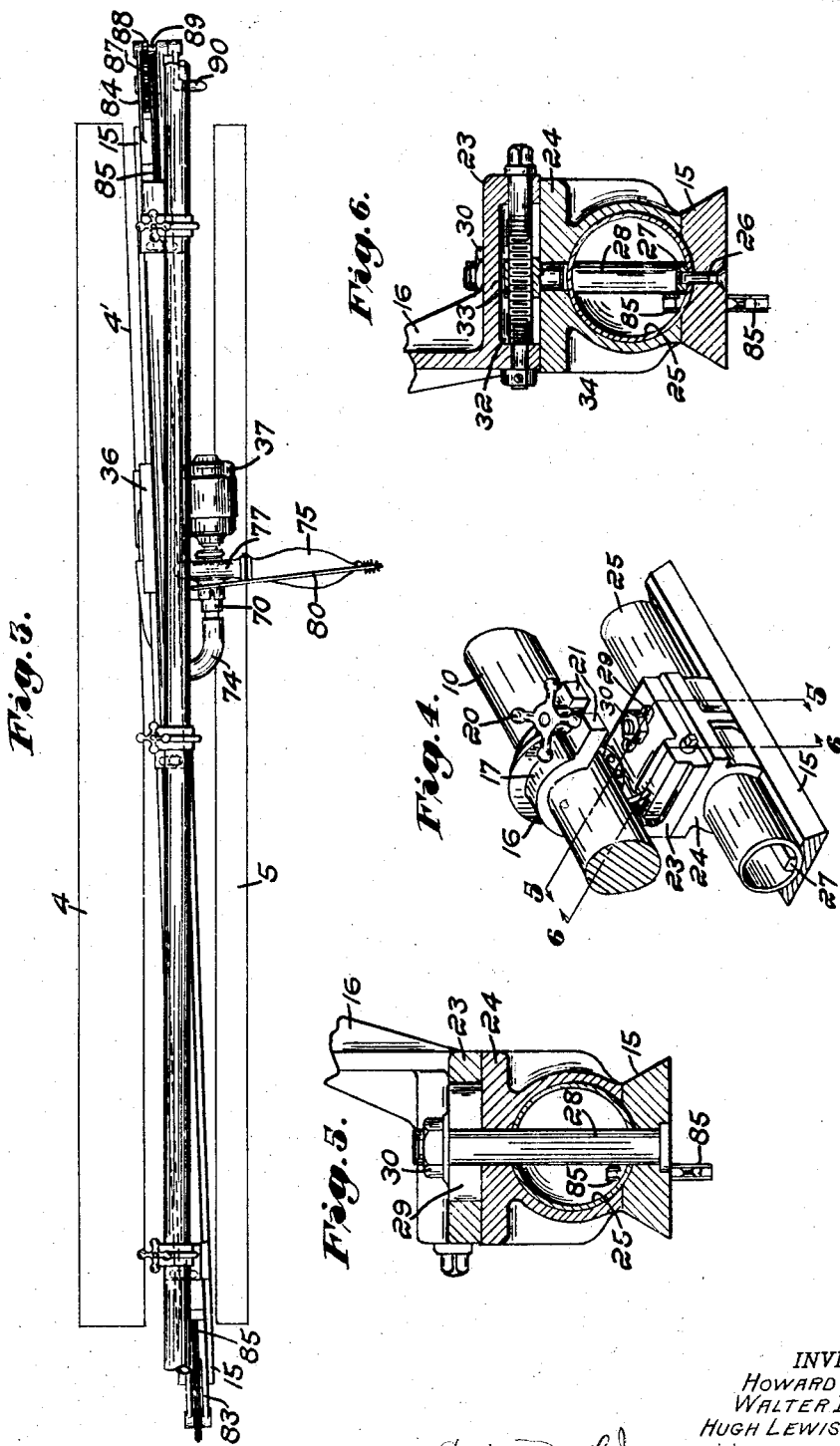

April 12, 1927.  H. MASON ET AL  1,624,494
GRINDING MECHANISM
Filed Jan. 30, 1926    8 Sheets-Sheet 3
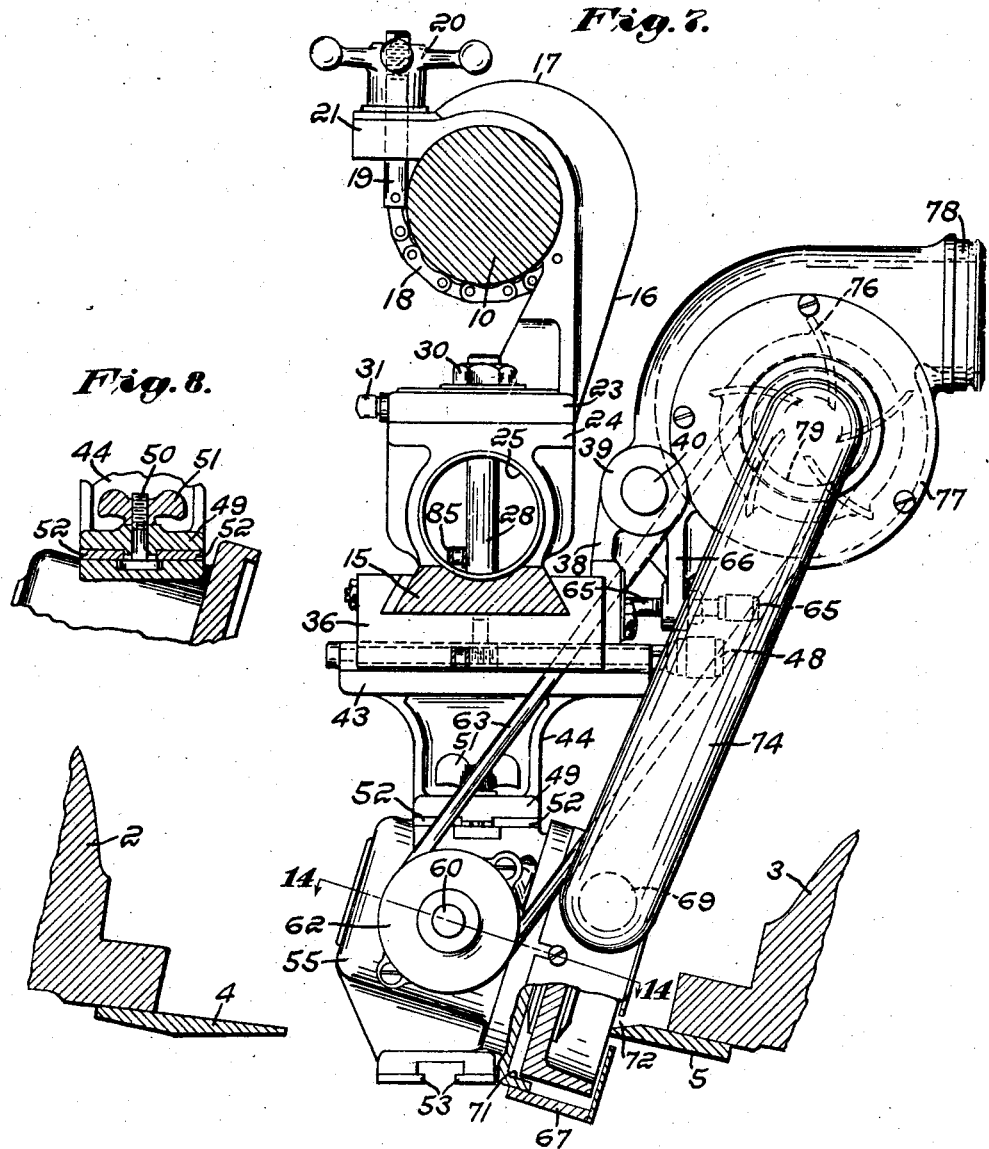
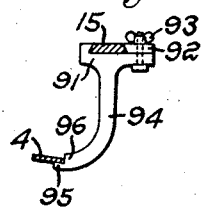
INVENTORS:
HOWARD MASON,
WALTER BIXBY,
HUGH LEWIS BOGAN JR.
BY Emery, Booth, Jenney & Varney ATTORNEYS.

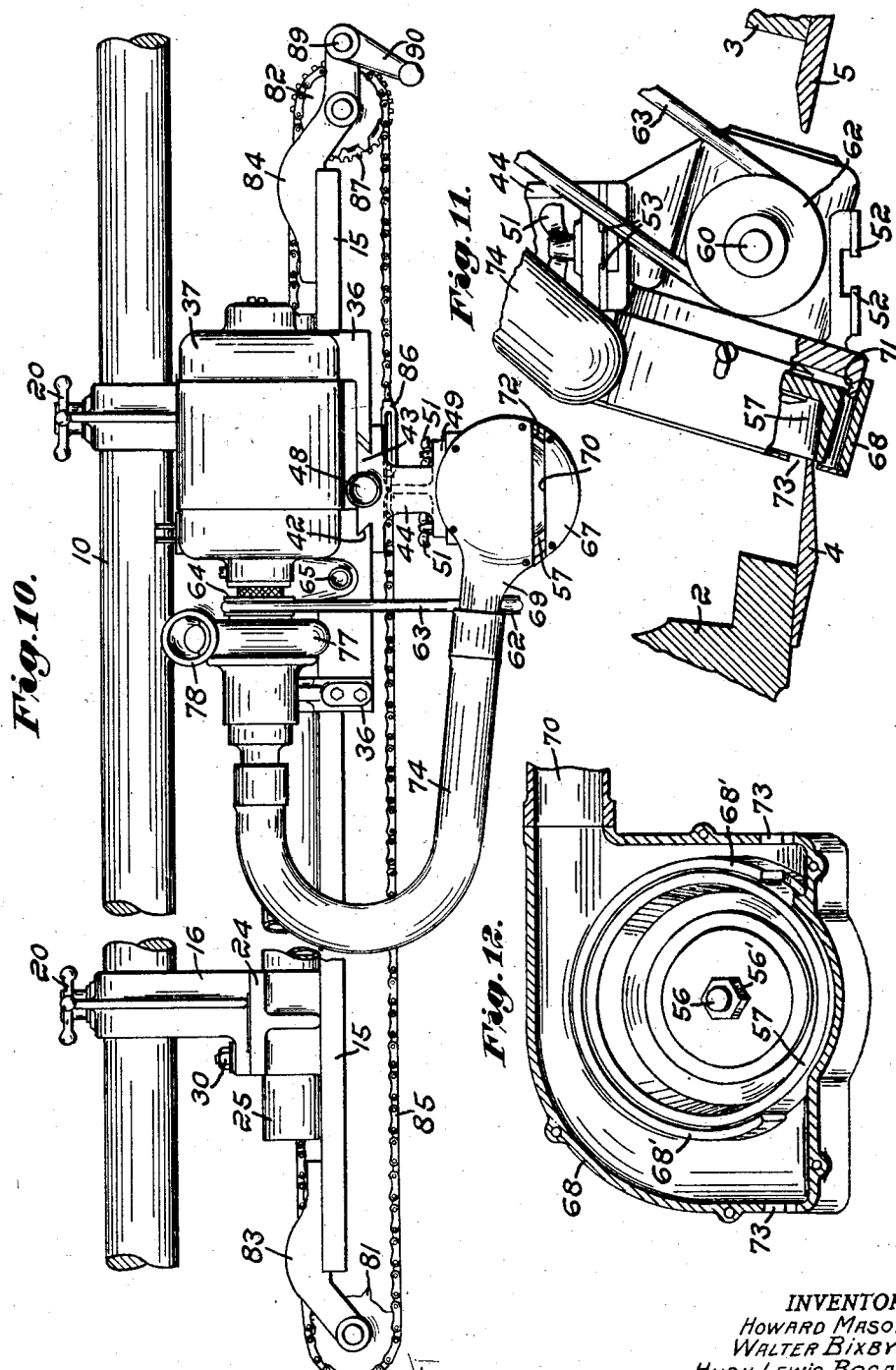

April 12, 1927.

H. MASON ET AL 1,624,494

GRINDING MECHANISM

Filed Jan. 30, 1926

INVENTORS:
HOWARD MASON,
WALTER BIXBY,
HUGH LEWIS BOGAN JR.
BY Emery, Booth, Janney & Varney ATTORNEYS.

April 12, 1927.

H. MASON ET AL 1,624,494

GRINDING MECHANISM

Filed Jan. 30, 1926

INVENTORS:
HOWARD MASON,
WALTER BIXBY,
HUGH LEWIS BOGAN JR.

BY Emery, Booth, Janney & Varney ATTORNEYS.

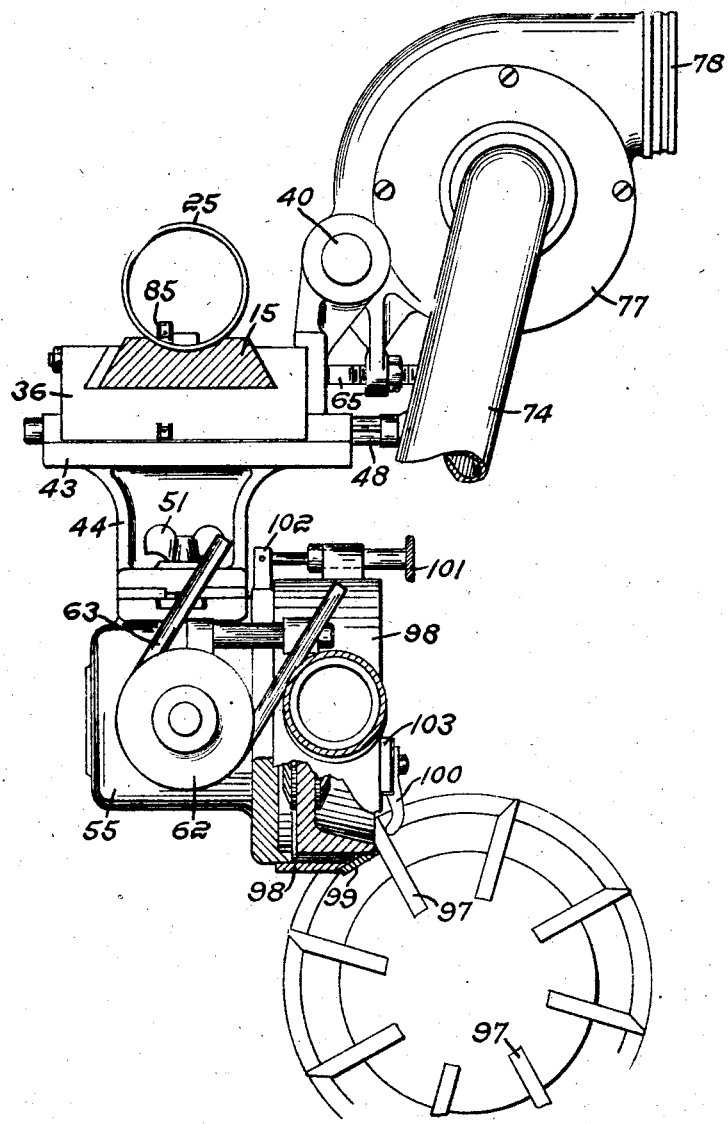

April 12, 1927.
H. MASON ET AL
1,624,494
GRINDING MECHANISM
Filed Jan. 30, 1926
8 Sheets-Sheet 8
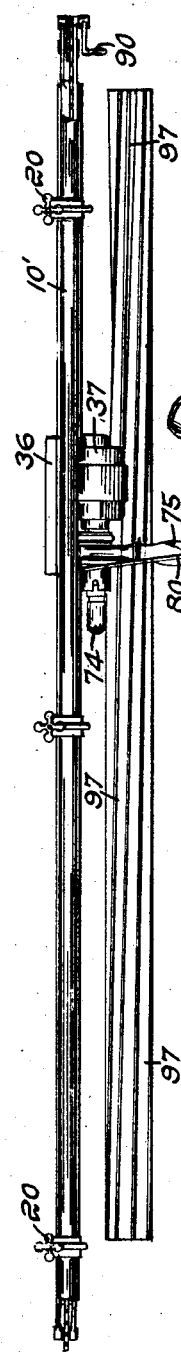
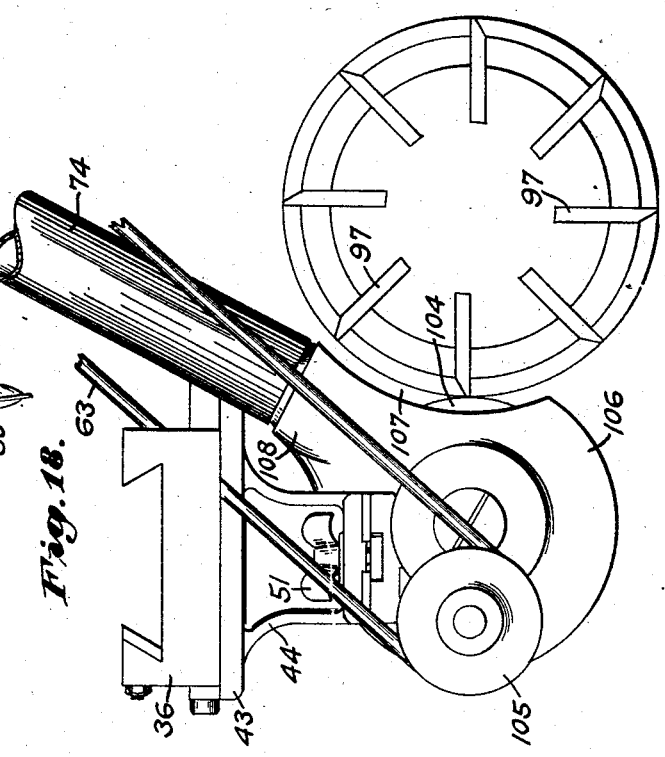
INVENTORS:
HOWARD MASON,
WALTER BIXBY,
HUGH LEWIS BOGAN JR.
BY Emery, Booth, Janney & Varney ATTORNEYS.

Patented Apr. 12, 1927.

1,624,494

UNITED STATES PATENT OFFICE.

HOWARD MASON, OF FRAMINGHAM, AND WALTER BIXBY AND HUGH LEWIS BOGAN, JR., OF BOSTON, MASSACHUSETTS, ASSIGNORS TO SHAWMUT ENGINEERING COMPANY, OF DORCHESTER, MASSACHUSETTS, A CORPORATION OF MASSACHUSETTS.

GRINDING MECHANISM.

Application filed January 30, 1926. Serial No. 84,939.

Our invention relates to grinding mechanism, and more particularly aims to provide an improved mechanism for grinding the knives or shear blades of tuft fabric or so-called moquette looms, carpet shearing machines, and the like textile or other machinery. In certain respects our present invention constitutes an improvement upon the device disclosed in the patent to Edgar F. Hathaway #1,469,755, dated October 2, 1923.

In the drawings illustrating by way of example certain forms of mechanism embodying our invention:—

Fig. 3 is a plan view illustrating one adjusted position of the mechanism, the loom parts aside from the shear blades and the grinding mechanism support being omitted;

Fig. 4 is a perspective view of one of the track supports upon a larger scale;

Figure 1:
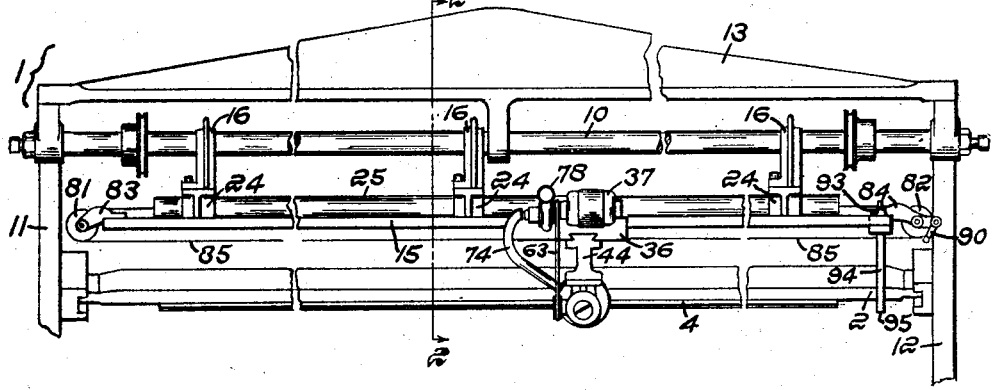
Fig. 1 is a general view in front elevation, illustrating one form of mechanism embodying our invention as applied to a tuft fabric loom.
Figure 13:
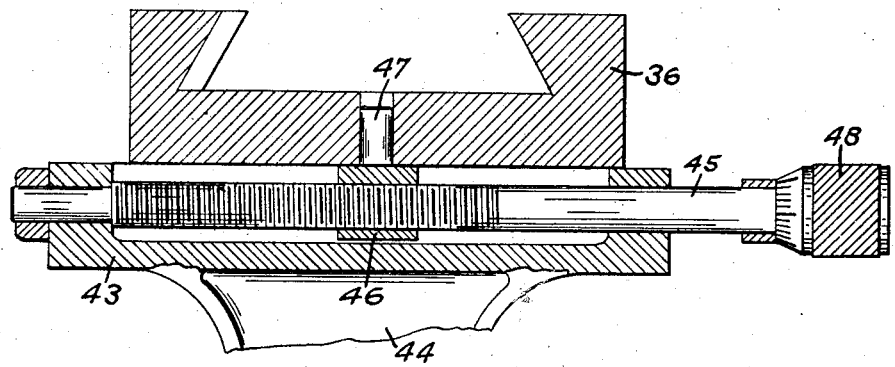
Figure 14:
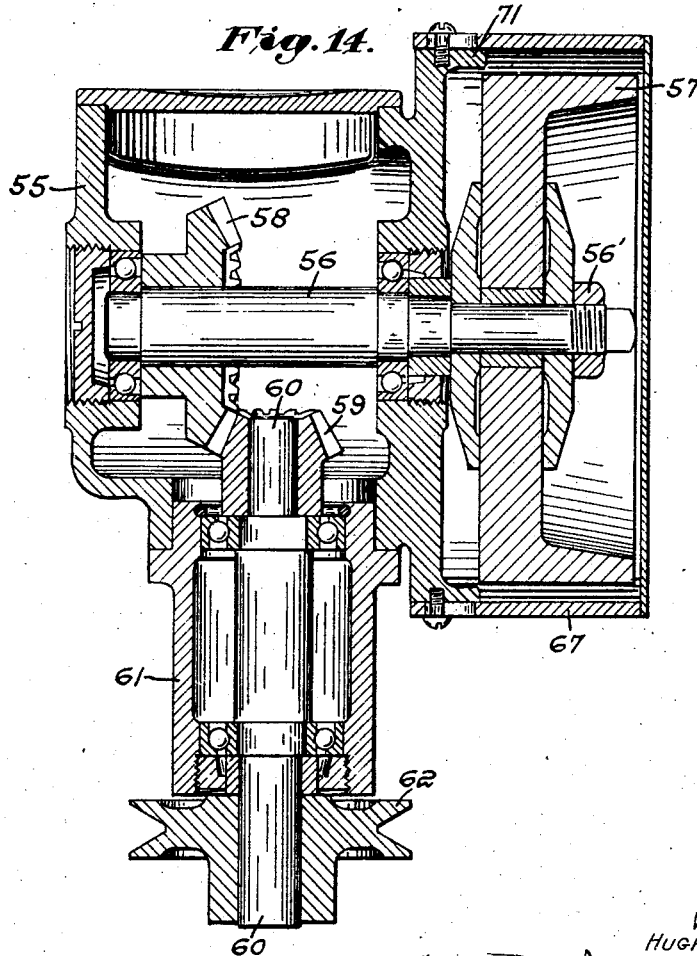
Figure 15:
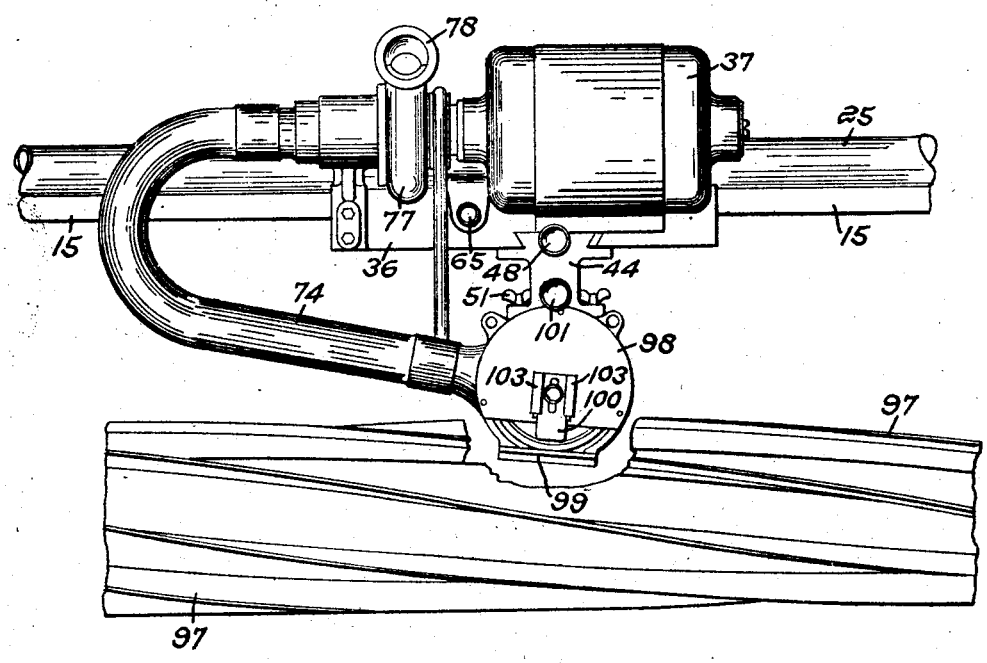

Figs. 5 and 6 are respectively vertical sections upon the lines 5—5 and 6—6 of Fig. 4, looking in the direction of the arrows;

Fig. 7 is a vertical cross-sectional view, upon a still larger scale, illustrating one position of the grinding mechanism relative to the knives to be ground;

Fig. 8 is a detail cross-sectional view;

Fig. 9, partly in cross-section and partly in side elevation, illustrates a means which may be employed in adjusting the grinder;

Fig. 10 is a front elevation of the grinding mechanism and supporting means, upon a scale intermediate that of Fig. 1 and Fig. 7;

Fig. 11, partly in vertical section and partly in side elevation, shows that part of the grinder seen at the lower portion of Fig. 7 but adjusted for operating upon the blade opposite to the one being ground in said Fig. 7;

Fig. 12 is a substantially vertical section through the grinder cover as employed in Fig. 11;

Fig. 13 is a detail view in cross section, upon a large scale, of certain adjusting means;

Fig. 14 is a section upon the line 14—14 of Fig. 7, upon a large scale;

Figs. 15 to 18 illustrate a form of our invention as applied to grinding the rotary knives of a carpet shearing or like machine; in said figures, Fig. 15 is a front elevation and Fig. 16 a side elevation, with portions in vertical section, of the device as set to operate upon the bevelled face of the blades;

Fig. 17 is a plan, upon a smaller scale; and

Fig. 18 is a view similar to Fig. 16 of a modified grinder attachment for grinding the end faces of the blades.

Figure 2:
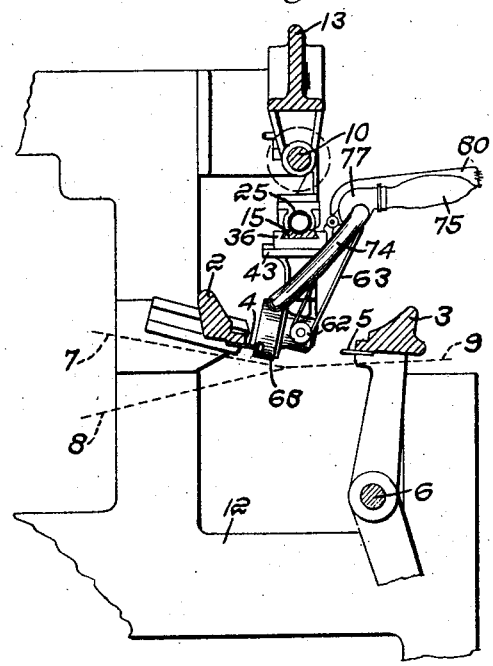
Fig. 2 is a vertical section substantially upon the line 2—2 of Fig. 1.

Referring first to Figs. 1 to 14, we have there illustrated one form of our invention as applied to a tuft fabric loom. In Figs. 1 and 2, the loom frame is indicated as a whole at 1, it being of any suitable shape or construction, and being provided with supporting bars 2, 3 for the tuft shearing blades or knives 4, 5. One of said blades, herein the blade 5 nearest the front of the loom, is supported for swinging movement, as at 6, while the other blade 4, nearer the back of the loom, has a sliding or like motion. Said blades or knives 4, 5 will accordingly be referred to hereinafter respectively as the slidable or rear blade and the swinging or front blade. The path of the warp yarns and of the fabric is indicated in Fig. 2 in dotted lines at 7, 8, 9.

The grinding mechanism as a whole is preferably portable and desirably is constructed and arranged so that it may be quickly attached to the loom or positioned thereon in readiness to operate upon the blades. A standard portion of the loom itself, or some easily attachable means, may be employed for supporting the grinder, and the entire grinding mechanism is preferably constructed with this in view. As shown in Figs. 1 to 14, we utilize for this purpose the cross shaft 10 extending between the loom sides 11, 12 adjacent the arch 13, this being the usual shaft about which passes the means for supporting the tufting yarn tube frames or presenting devices, not shown.

The grinding mechanism proper is mounted upon a suitable carriage or support which is traversable lengthwise the blades, and herein along a bar or track 15, preferably of a light but strong material such as duralumin or other aluminum alloy, adapted to be supported in substantial parallelism with the surface to be ground. As clearly seen in Fig. 1 said track is detachably secured to the shaft 10 by a series of brackets 16, three of which are indicated in Figs. 1 and 3.

As best seen in Figs. 4 to 7, each bracket 16 includes a hook-like portion 17 adapted to seat upon the shaft 10 and to be secured to it as by the flexible connection 18, having a threaded bolt 19 at its outer end receiving the nut 20. By passing said bolt between the ears 21 upon the bracket, and tightening said nut down against them the bracket is securely held in position upon the shaft, whence it may readily be removed by a reverse operation. Each bracket extends downwardly to a position below the shaft where it terminates in a base portion to which the track is secured.

In usual practice one or both of the knives of a moquette loom may have an edge of which a portion is inclined with respect to the remainder of the knife, as illustrated for example in Fig. 3, in which the sliding or back knife 4 is so shaped at its right end, as at 4'. In order that the grinding mechanism may be accurately traversed along such inclined portion of a blade in proper grinding relation to it, the track is made adjustable transversely of the blades so that it may be shifted into a position such as illustrated in Fig. 3.

Accordingly, and referring particularly to said Figs. 4 to 7, the base portion of each bracket includes a foot 23 to which is adjustably secured a yoke 24. Extending through the yokes 24 of the several brackets 16 is a tube 25, of substantially the length of the track. The latter is fixed to the tube as by means of screws 26, see Fig. 6, passing through the track and tube and tapped into a securing strip 27, Figs. 4 and 6, within the tube. Said track supporting tube 25 being in turn held by said yokes 24, adjustment of the latter relative to the bracket feet 23 will cause the track to be shifted transversely.

To permit such adjustment of the yokes each is secured to its respective bracket as by means of a bolt 28, Figs. 5, 6 and 7, passed upwardly through the track and yoke, and through a slightly arcuate slot 29 formed in the bracket foot 23. A nut 30 upon the upper end of said bolt straddles the slot.

Suitable means is provided for shifting the track relatively to its support in the described manner. As best seen in Fig. 6, a transverse worm 31 is rotatably mounted in a recess 32 in the foot portion of each bracket. Each worm 31 cooperates with a nut 33 having a depending lug 34 seated in an aperture in the upper face of the adjacent yoke 24. By turning a worm 31 its nut 33 is caused to move crosswise of the track, carrying with it its track-supporting yoke. The track may thus be shifted bodily into an oblique position, such as illustrated in Fig. 3.

Upon the track 15 is the movable support or carriage 36 for the grinder assembly, best seen in Figs. 7 and 10, and upon a larger scale in Fig. 13. As illustrated, the side faces of the track are bevelled and the engaging portion of the carriage is correspondingly shaped. Upon said carriage is an electric motor 37 or other power unit, preferably adjustable relatively to the carriage about a substantially horizontal axis, as seen in Fig. 7, wherein we have shown the carriage as provided with upwardly projecting brackets 38 having bearings 39 receiving a short shaft 40 secured to the motor casing.

The grinding mechanism proper is supported upon said carriage 36 and desirably in such manner as to be adjustable transversely thereof. As best seen in Figs. 10 and 13, the carriage has formed in its lower face a transverse, dove-tailed groove 42 receiving a similarly shaped head 43 from which depends the grinder supporting bracket 44. Said head 43 may be shifted crosswise of the carriage by any suitable means, such for example as illustrated in Fig. 13, wherein the head is recessed upon its upper face to receive a screw 45 cooperating with a nut 46 upon which is an upwardly projecting lug 47 engaged in a recess in the carriage. Turning of said screw, as by the calibrated knurled head 48, will thus cause the head 43 and grinder bracket 44 to be shifted relatively to the carriage. In this manner the grinding mechanism proper, supported by said head and bracket, may be accurately adjusted to the work to be ground.

The grinder and its housing and associated mechanism, constituting what may be termed the grinder unit, are removably secured at the lower portion of said grinder bracket 44. In Figs. 7 and 10 the grinder and housing are shown in position for acting upon the front or straight knife, but the construction is desirably such that said grinder unit as a whole may be detached from its supporting bracket 44 and reversed or inverted so as to bring it into position to act upon the back or inclined blade, as in Figs. 1, 2, 3 and 11.

Accordingly the grinder bracket 44 is formed with a base 49 at the opposite ends of which, as viewed in Fig. 10, are bolts 50, each having a head depending below the base and each provided at its upper and threaded end with a wing nut 51: see also Figs. 8 and 11. The grinder housing has formed at opposite points, herein upon its top and bottom as viewed in Figs. 7 and 11, pairs of opposed flanges 52, 53, either of which may be slid over the depending heads of the bolts 50 accordingly as the front or the rear knife is to be ground. The grinder unit is securely fixed to the bracket 44 in either of its positions, by tightening down the wing nuts 51.

As best seen in section in Fig. 14, the grinder unit includes a gear case 55 within which the transverse grinder shaft 56 is rotatable in suitable bearings. On the outer end of said shaft is the grinder member or wheel 57 which may be of any suitable type, removably attached to the shaft as by the nut 56′. Near the opposite end of said grinder shaft 56 is a bevel gear 58 meshing with a pinion 59 upon the inner end of the drive shaft 60 at substantially right angles to the grinder shaft and rotatably supported in suitable bearings in a sleeve 61 projecting from the gear case 55. At the outer end of said drive shaft 60 is a pulley 62 adapted to receive a belt 63 passing about a pulley 64 upon the motor shaft; see Fig. 10. The tension of said belt may be adjusted by means of the belt tightening screw 65, Fig. 7, tapped in a lug 66 upon the motor casing and taking at its inner end against the bracket 38 on the carriage. By turning said belt-tightening screw the motor assembly may be moved about the pivot 40 in one or the opposite directions thereby to tighten or loosen the belt.

Through the gearing and connections above described the grinding member or wheel 57 is driven from the power source, herein the electric motor 37 travelling with the carriage. It will be understood, however, that an outside power source might be employed, as for example in said patent to Hathaway, Fig. 7.

Desirably the grinder is substantially wholly enclosed so that the particles of abrasive, chips or "sparks" from the knives, and the like waste matter produced in the grinding process, and all included herein in the term dust, may be caught and retained, preventing them from accumulating upon the loom or on the fabric being woven. For this purpose we have provided an enclosing cover or hood 67 of Figs. 7, 10 and 14, or 68 of Figs. 1, 2, 3, 11 and 12.

Said two covers are substantially similar and are interchangeable, but have oppositely directed dust outlets 69, 70 respectively, the cover 67 being employed when the front or swinging knife is to be ground while the other cover 68 is for use when working upon the rear or sliding knife. They are of general drum-like form having one open end adapted to fit over a collar 71 secured to the grinder gear casing and concentric with the grinder shaft 56. Selectively, either of the covers may be removably secured to said collar through screw and slot or like connections, as shown. In the front face of each cover are the openings or slits 72 and 73 respectively, through which the blade to be ground may be brought into contact with the grinder wheel.

The use for the two covers, with opposite disposition of waste outlets, will be apparent from the following considerations. As seen in Figs. 7, 10 and 14, the grinder is positioned for operating upon the front knife 5. Assuming that the grinder shaft is rotated in a clockwise direction, looking from the front of the loom, as in Fig. 10, the waste will be projected from the point of contact of the grinder and knife in the general direction indicated by the arrow upon the grinder cover in said figure, that is, to the left in Fig. 10 and toward the left side of the loom; the outlet 69 for the waste is accordingly upon the left side of the cover 67 as viewed in said figure.

Assume now that the grinder and associated mechanism is inverted for operation upon the opposite or rear blade, but keeping the pulley 62 toward the same side of the loom, so as still to come in line with the motor pulley 64; that is, the grinder unit is turned 180° bodily about the axis of the pulley, (see Fig. 7). The actual direction of rotation of the grinder shaft is not changed, as still viewed from the loom front, but the outer face of the cover is then toward the back of the loom, and, as viewed from the back of the loom the direction of rotation of the grinder shaft is reverse, and the waste is projected, still toward the left of the viewer at the loom rear, but toward the right hand side of the loom looking from the loom front as in Fig. 10. The main dust stream will thus be projected in a direction away from the pulley 62 rather than toward it, as in Fig. 10. The effect is the same as if no change in the position of the grinder wheel were made but the work applied in one instance to the bottom edge of the wheel and in the other to the top edge. Hence the two covers 67 and 68 having differently disposed outlets are necessary in order to assure the most efficient collection of the dust, whichever blade is being ground.

Each cover is formed interiorly to provide a suitable passage for collecting and conducting the dust to the outlet. In the cover 67 for working on the front blade the dust stream goes almost directly to the cover outlet; in the cover 68 for use when grinding on the rear blade, the stream of waste is led partly around and over the wheel, in the manner best seen in Fig. 12. In the cover 67 but a short passage is needed, while in the cover 68 the passage or chamber partly surrounds the wheel, being formed by the outer wall of the cover and a flange 68', see Fig. 12, adjacent the grinder wheel.

The dust from the grinding operation is thus retained within the respective grinder cover or housing, and is preferably conducted from it through the cover outlet 69 or 70 and through a flexible hose or pipe 74 to a waste receptacle 75 provided for the purpose, and shown in attached position in Figs. 2 and 3 but omitted in other figures to prevent obscuring of other parts. To insure the removal of the collecting waste or dust we have provided suitable pneumatic means, herein illustrated as mounted upon the carriage 36 in position to cooperate with the motor and grinder. As best seen in Figs. 7 and 10 there is secured to a projecting portion of the motor shaft a fan or blower 76 enclosed in a suitable housing 77 communicating at 78 with said receptacle or bag 75. The incoming dust enters the blower housing at the central aperture 79, passes through or around the fan and into the receptacle 75, which is preferably removably attached to the blower housing and, if desired, held in proper extended position as by means of the arm or wire 80 secured at its outer end to the free end of the bag and at its inner end to the grinder carriage.

As previously stated, the grinding mechanism is adapted for traversing movement lengthwise of the blades to be ground, the carriage 36 supporting said mechanism being movable upon the track 15 provided for the purpose. Movement of the carriage along the track may be effected directly by the hand of the operator, or by suitable mechanism, either manual or fully automatic. Herein for the purpose, we have provided sprocket wheels 81, 82 at opposite ends of the track 15, as best seen in Fig. 10, and also in Figs. 1 and 3, rotatably supported upon forked arms 83, 84, and about which passes a sprocket chain 85 connected at its opposite ends to the carriage 36. Desirably a turn-buckle 86 or like tension adjusting means is provided at one end of the chain.

As clearly seen in Fig. 10, the chain extends from one end of the carriage up and around one sprocket wheel, then through the track supporting tube 25, over the other sprocket wheel and back to the carriage. By turning one of said wheels the carriage will thus be shifted longitudinally of the track. The sprocket wheel 82, as herein shown, has fixed upon its shaft a gear 87, meshing with a pinion 88, Fig. 3, upon a stud shaft 89 mounted in a projection of the arm 84. A crank 90 is secured to said shaft, by means of which the sprocket wheel 82 may be rotated, through the gears described, thereby to move the chain and to traverse the carriage and grinder.

In applying the device to the loom or other machine of which the knives are to be ground the track should be carefully adjusted relative to the knives. A similar adjustment is necessary when an inclined knife or knife portion is to be ground, as in Fig. 3. The proper position of the track may be ascertained by moving the carriage along it and noting that the grinder wheel makes proper contact with the blade at its various points. Preferably, however, we provide a track gauge cooperatively associated with the track, by use of which such shifting of the grinder and carriage when setting the track may be avoided.

One form of such device is illustrated in Fig. 9. It comprises a traveler portion 91 slotted to fit the track 15, and including a swingable locking piece 92 held by a set screw 93, whereby the gauge may readily be applied to or removed from the track. Ordinarily it may be kept on the track near one end. Depending from the traveler is a finger 94 having at its outer end a lip 95 and a shoulder 96 adapted to take against the blade to be ground. The construction of the finger is such that said shoulder occupies exactly the same position relative to the track as that portion of the grinder wheel which should make contact with the blade. By moving this easily manipulated gauge along the track, with its shoulder 96 in contact with the blade, accurate setting of the track is assured, obviating the use of the grinder itself as a gauge.

Referring now to Figs. 15 to 18, we have there illustrated grinding mechanism also embodying our invention and adapted for operation upon the blades of a carpet shearing machine. In such machines the blades are rotary and generally of the spiral type shown. In said figures parts otherwise not referred to may be similar to those in the figures previously described. The track 15 may be secured in a manner similar to that in Figs. 1 to 14 to a shaft or bar 10', Fig. 17, extending lengthwise of the knives 97 at a suitable point above them. A special bar or support may be provided for this purpose if necessary.

In rotary blades of this type it is sometimes desirable to grind both the end face and the bevelled face of the blade, and our mechanism is adaptable for either of said operations.

In Figs. 15 and 16 the grinding mechanism is illustrated in its position for operating on the bevelled face of the knives. In this instance a cover 98, substantially the same as the cover 67 of Figs. 7, 10 and 14, is employed but having a lip 99, the edge of which is adapted to seat against one side face of a knife. Upon its opposite face the knife to be ground is engaged by a finger 100 upon the cover and cooperating with said lip 99 to maintain the grinder and knife in proper operating relation. The series of blades is permitted to turn freely about its axis so that as the grinder carriage is moved along one of the spiral blades 97 the latter may move sufficiently to preserve the grinding contact. An adjusting screw 101 fixed upon the grinder housing or cover and engaging at its opposite end a lug 102 upon the gear casing may be provided for fine adjustment of said housing toward or away from the blade, in substantial parallelism with the grinder shaft. The finger 100 is also preferably adjustable vertically, being slidably secured to the face of the grinder cover by the slot and bolt connection seen in Figs. 15 and 16, and being held transversely by the overlying flanges 103.

In Fig. 18 is shown a grinder unit for acting upon the outer edges of the knives. In this instance the grinder wheel 104 is on a shaft at right angles to that in the forms previously described, being parallel with the motor shaft, and geared to the pulley 105. The cover 106 for the grinding wheel has a vertical arcuate opening 107 giving access to the grinder, above which opening is the upwardly directed outlet 108 communicating with the hose 74 for conducting the waste to the receptacle.

From the foregoing it will be understood that we have devised an improved, readily portable and highly efficient grinding mechanism including a carriage and interchangeable grinding units, and which may easily be attached to a moquette loom or other machine having knives to be ground for operation upon the knives while the latter are in their usual assembled position upon the machine, with resultant great saving in labor expense and avoidance of loss of production through idleness of the machine necessarily occasioned if the knives had to be dismounted for grinding.

Our invention is not limited to the particular embodiments shown and described herein by way of illustration, its scope being set forth in the following claims.

Claims.

1. In combination with a tuft fabric loom having a pair of opposed knives and a cross shaft adjacent and substantially parallel with the latter, mechanism for grinding said knives, comprising an elongated tubular supporting element, a track extending along and secured to said element, a plurality of brackets readily detachably securable to said cross shaft, means connecting each bracket to said supporting element in a manner permitting adjustment of the latter transversely of said shaft, and a grinder carriage having a grinder thereon, said carriage mounted for movement along said track with said grinder in working engagement with one or the other of said knives selectively.

2. In combination with a tuft fabric loom having a pair of opposed knives and a cross shaft adjacent and substantially parallel with the latter, mechanism for grinding said knives comprising an elongated tubular supporting element, a track extending along and secured to said element, a plurality of brackets readily detachably securable to said cross shaft, means connecting each bracket to said supporting element in a manner permitting adjustment of the latter transversely of said shaft and in opposite directions at its opposite ends, a grinder carriage having a grinder thereon, said carriage mounted for movement along said track with said grinder in working engagement with one or the other of said knives selectively, rotatable members at the opposite ends of said track, and a flexible element secured to said carriage and passing about said rotatable members to form a double-run endless travelling means for the carriage, one run of said flexible element extending through said tubular supporting element.

3. In mechanism for grinding the opposed knives of tuft fabric looms while in place thereon; a track supportable upon the loom above the knives to be ground; a carriage movable on said track, said carriage comprising a slide portion and a depending bracket portion; a motor on said slide portion of the carriage and provided with a pulley; and a grinder unit comprising a rotary grinding element, a shaft therefor, and shaft driving means including a pulley operatively connectable with said motor pulley, said grinder unit and said bracket portion of the carriage provided with cooperating means for securing said unit to the bracket with said grinding element reversible as if about the axis of its driving pulley to position it for operation upon one or the other of said opposed knives.

4. In mechanism for grinding the opposed knives of tuft fabric looms while in place thereon; a track supportable upon the loom above the knives to be ground; a carriage movable on said track, said carriage comprising a slide portion and a depending bracket portion; a motor on said slide portion of the carriage and provided with a pulley; and a grinder unit comprising a rotary grinding element, a shaft therefor, and shaft driving means including a pulley operatively connectable with said motor pulley, said grinder unit and said bracket portion of the carriage provided with cooperating means for securing said unit to the bracket with said grinding element reversible upon and relative to said bracket to bring said grinding element in position for operation on one or the other of said opposed knives but maintaining substantially the same position of the grinder pulley and the motor pulley relatively to each other.

5. In mechanism for grinding the opposed knives of tuft fabric looms while in place thereon; a track supportable upon the loom above the knives to be ground; a carriage movable on said track, said carriage comprising a slide portion and a depending bracket portion; a motor on said slide portion of the carriage and provided with a pulley; and a grinder unit comprising a rotary grinding element, a shaft therefor, and shaft driving means including a pulley operatively connectable with said motor pulley, said grinder unit and said bracket portion of the carriage provided with cooperating means for securing said unit to the bracket with said grinding element reversible by bodily shifting it relatively to the bracket and in a manner to bring either its top or its bottom face into juxtaposed relation therewith, to position the grinding element for operation upon one or the other of said opposed knives.

6. In a grinding mechanism particularly adapted for grinding the opposed knives of textile machinery, a carriage traversible lengthwise the knife to be ground, a grinder unit including a rotary grinder and a shaft therefor having a power receiving member, and supporting connections between said unit and carriage whereby the unit may be attached thereto in either of two positions so as to bring the grinder to one or the opposite side of the carriage to grind one or the other of the opposed knives, said connections including a formation comprising a pair of flanges and a cooperative formation for reception thereby, one of said formations being on the carriage and the other on the grinder unit, the formation on the grinder unit being duplicated on vertically opposed sides thereof for alternative engagement with the formation on the carriage.

7. In a grinding mechanism particularly adapted for grinding the knives of textile machinery, a carriage traversible lengthwise the knife to be ground, a grinder unit including a rotary grinder on an axis at substantially right angles to the knife to be ground, and supporting connections between said unit and carriage whereby the unit may be attached thereto in either of two positions so as to bring the grinder to one or the opposite side of the carriage, said connections including pairs of flanges respectively on vertically opposed sides of the grinder unit and selectively engageable with a supporting element on the carriage.

In testimony whereof, we have signed our names to this specification.

HOWARD MASON.
WALTER BIXBY.
HUGH LEWIS BOGAN, Jr.